United States Patent
Sung et al.

[11] Patent Number: 5,678,835
[45] Date of Patent: Oct. 21, 1997

[54] THREE-WHEELED VEHICLE HAVING AN AUXILIARY STEERING SYSTEM

[75] Inventors: Cheng-Kuo Sung; Kuo-Hong You, both of Hsinchu, Taiwan

[73] Assignee: National Science Council, Taipei, Taiwan

[21] Appl. No.: 501,292

[22] Filed: Jul. 12, 1995

[51] Int. Cl.$^6$ ............................................ B62K 5/00
[52] U.S. Cl. ............................ 280/270; 280/282
[58] Field of Search ........................ 280/282, 281.1, 280/263, 288.1, 267, 270, 276

[56] References Cited

U.S. PATENT DOCUMENTS

| | | | |
|---|---|---|---|
| 3,937,486 | 2/1976 | Weiters | 280/282 |
| 3,981,516 | 9/1976 | Haggkvist | 280/282 |
| 3,995,875 | 12/1976 | Wada | 280/282 |
| 4,132,435 | 1/1979 | Wilson | 280/282 |
| 4,424,877 | 1/1984 | Kawasaki | 280/282 |
| 5,568,935 | 10/1996 | Mason | 280/288.1 |

FOREIGN PATENT DOCUMENTS

| | | | |
|---|---|---|---|
| 925892 | 4/1947 | France | 280/263 |
| 74206282 | 7/1985 | Taiwan . | |
| 8101 | of 1884 | United Kingdom | 280/263 |

*Primary Examiner*—Brian L. Johnson
*Assistant Examiner*—Gary Savitt
*Attorney, Agent, or Firm*—Hitt Chwang & Gaines P.C.

[57] ABSTRACT

A three-wheeled vehicle has an auxiliary steering system which is made up of a front frame, a rear frame, a bearing element, a gear set, and a transmission element. The gear set comprises a first gear and a second gear. The first gear is fastened with the front frame while the second gear is fastened rotatably with the rear frame such that the second gear is engageable directly or indirectly with the first gear. The front frame can be caused to swivel in relation to the rear frame by means of the second gear which is actuated by an angular motion of the front fork of the vehicle when the handlebar of the vehicle is turned. The transmission element serves to transmit the angular motion of the front fork to the second gear. The auxiliary steering system is therefore capable of causing the center of gravity of a rider of the vehicle in motion to move toward a direction in which the handlebar of the vehicle is turned, thereby causing the centrifugal force exerting on the vehicle rider to be canceled out.

4 Claims, 4 Drawing Sheets

5,678,835

THREE-WHEELED VEHICLE HAVING AN AUXILIARY STEERING SYSTEM

FIELD OF THE INVENTION

The present invention relates generally to an auxiliary steering system suitable for use in a three-wheeled vehicle, and more particularly to an auxiliary steering system capable of causing the center of gravity of a rider of the three-wheeled vehicle to move toward a direction in which the three-wheeled vehicle on the move is negotiating a sharp curve.

BACKGROUND OF THE INVENTION

With the exception of the front fork for steering, all components of a conventional three-wheeled vehicle are fastened securely to the frame of the three-wheeled vehicle. As a result, the three-wheeled vehicle is rather vulnerable to overturn when the three-wheeled vehicle is negotiating a curve while cruising at a high speed. Such an overturn of the three-wheeled vehicle as described above is caused by an imbalance brought about by the combined effect of a centrifugal force of the rider and the frame, as well as a thrust of the rear wheels in motion.

With a view to overcoming such an operational deficiency of the conventional three-wheeled vehicle as described above, various improvements on the construction of the conventional three-wheeled vehicle have been made, as exemplified by the Taiwanese Patent Serial Number 74206282 in which a three-wheeled vehicle having an automatic swiveling device is disclosed. As shown in FIG. 5, FIG. 5(a) and FIG. 5(b) this prior art three-wheeled vehicle comprises a front frame 80, a rear frame 81, a bearing mechanism, and two tilting systems 91. The front frame 80 and the rear frame 81 are fastened together pivotally by the bearing mechanism. The bearing mechanism is composed of a sleeve 85 provided on a vertical rod of the front frame 80, two bearings 86 located respectively at both ends of the sleeve 85, and a bolt 87 for fastening a horizontal rod of the rear frame 81 with the bearings 86. The tilting systems 91 are located respectively between the front frame 80 and a bottom frame 83, and at the left and right side of a saddle of said three-wheeled vehicle. A handlebar of the prior art three-wheeled vehicle in question is provided at its left and right handles respectively with a steering rod 84 which is connected by means of a steel cable with one of two steering systems 82 located respectively on the left side and the right side of the bottom frame 83. The steering systems 82 can be triggered respectively by the steering rods 84 of the handlebar so as to cause the front frame 80 located on either left side or right side of the saddle to tilt toward to bottom frame 83, depending on which steering rod 84 is actuated. In other words, the horizontally located front frame 80 can be caused to swivel in a direction in which the vehicle is turned, thanks to the bearing mechanism and two tilting systems 91. As a result, the centrifugal force exerting on the rider of the vehicle in motion is canceled out by the tilting of the front frame 80 when the vehicle in motion is negotiating a curve.

Such a prior art swiveling device as described above is defective in design in that the front frame 80 is vulnerable to tilting when the center of gravity of the vehicle rider or load is not located at the midpoint of two tilting systems 90 and 91, and that the steering system 82 can not be actuated without an additional power source and a clutch.

SUMMARY OF THE INVENTION

It is therefore the primary objective of the present invention to provide a three-wheeled vehicle having an auxiliary steering system which can be actuated by the steering effect of the handlebar of the vehicle.

In keeping with the principle of the present invention, the foregoing objective of the present invention is attained by a three-wheeled vehicle, which comprises a frame and a steering system. The frame is supported horizontally on three wheels fastened rotatably thereto such that the centers of the three wheels form an isosceles triangle. The steering system comprises a front fork, which is fastened rotatably with the frame. The front fork is provided at the upper end thereof with a handlebar fastened thereto and at the lower end thereof with a front wheel fastened rotatably thereto.

The three-wheeled vehicle of the present invention further comprises an auxiliary steering system, which is composed of a front frame, a rear frame, a bearing mechanism, a first gear, a second gear, and a transmission mechanism. The front frame is provided at one end thereof with the front fork. The rear frame is provided at one end thereof with two rear wheels fastened rotatably thereto. In other words, the frame of the three-wheeled vehicle of the present invention is made up of the front frame and the rear frame, which are fastened together pivotally by the bearing mechanism, and a planar surface defined by a central axis round which said front fork is rotated and a pivoting axis of said bearing mechanism divides equally said isosceles triangle formed by the centers of the three wheels. The first gear is fastened securely with the front frame while the second gear is fastened rotatably with the rear frame such that the second gear is engageable indirectly with the first gear. The angular motion of the front fork is transmitted to the second gear by the transmission mechanism. The front frame can be caused to turn on the pivoting axis of the bearing mechanism in a direction in which the handlebar is turned, thanks to the direct or indirect engagement of the first gear with the second gear.

The foregoing objective, features and advantages of the present invention will be more readily understood upon a thoughtful deliberation of the following detailed description of the embodiment of the present invention in conjunction with the accompanying drawings.

BRIEF DESCRIPTION OF THE DRAWINGS

FIG. 1(a) shows an enlarged perspective view of a disk and cables of the three-wheeled vehicle of FIG. 1.

FIG. 5(a) shows a top view of a handle of the three-wheeled vehicle of FIG. 5.

FIG. 5(b) shows a partial cross-sectional view of a bearing mechanism of the three-wheeled vehicle of FIG. 5.

DETAILED DESCRIPTION OF THE EMBODIMENTS

Figure 1:
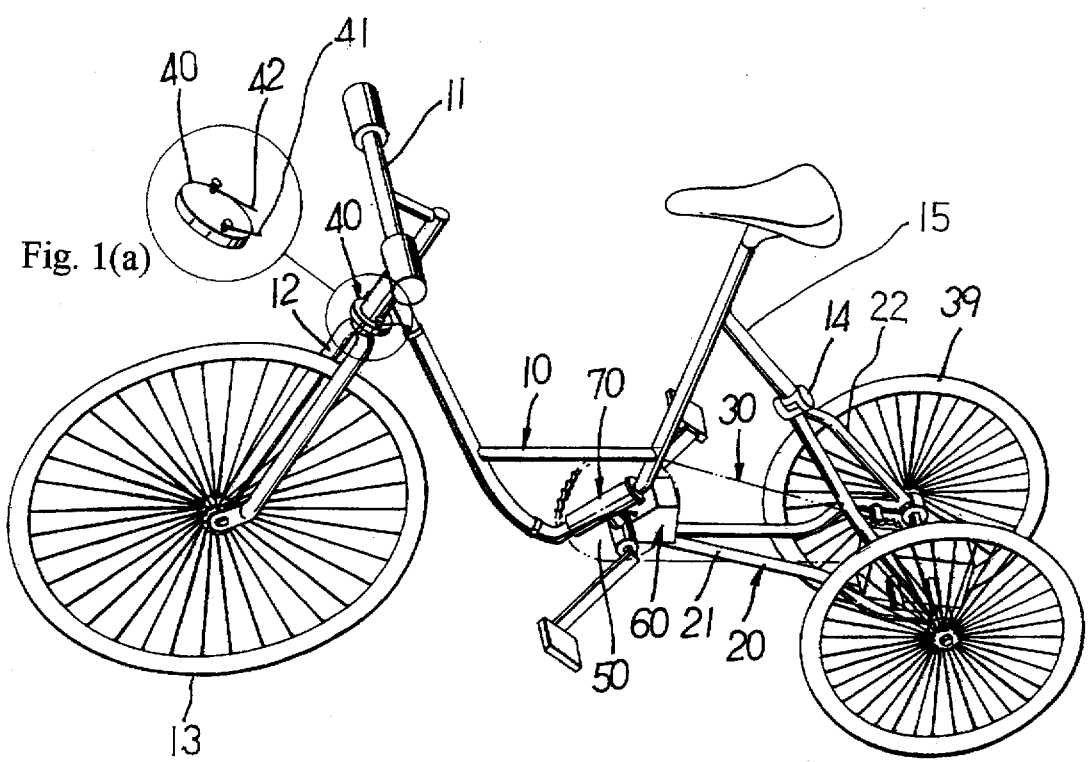
FIG. 1 shows a perspective view of a three-wheeled vehicle embodied in the present invention.

As shown in FIG. 1, the three-wheeled vehicle of the present invention has a frame which is composed of a front frame 10 and a rear frame 20. The front frame 10 is provided at the front end thereof with a front fork 12 fastened rotatably thereto. The front fork 12 is provided at the top thereof with a handlebar 11 fastened thereto securely, and at the bottom thereof with a front wheel 13. Fastened to the rear end of the front fork 10 are a saddle and a reinforcing rod 15. The rear frame 20 is composed of a bottom frame 21 of a triangular construction and two support frames 22 fastened respectively at the bottom ends thereof with the two rear points of the bottom frame 21 such that two support frames 22 extend upwardly and obliquely. Two rear wheels 39 are mounted rotatably at the junctions of the bottom frame 21 and the support frames 22.

Figure 2:
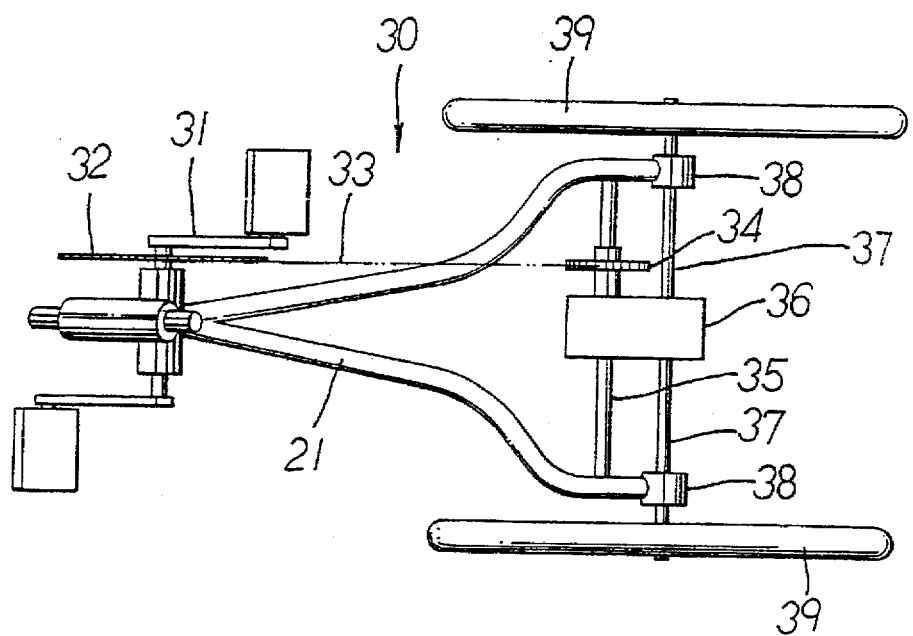
FIG. 2 shows a schematic plan view of a driving system of the three-wheeled vehicle as shown in FIG. 1.

As shown in FIGS. 1 and 2, a driving system 30 is mounted on the bottom frame 21 and is composed of two pedals 31 and a sprocket wheel 32, which are fastened with the front end of the bottom frame 21. The driving system 30 is further composed of a flywheel 34 and a differential gear 36, which-are mounted on a shaft 35 located at near the rear side the bottom frame 21. The driving system 30 is still further composed of a drive chain 33 linking the sprocket wheel 32 and the flywheel 34. As the pedals 31 are pedaled, the differential gear 36 is driven to cause two output shafts 37 to turn. It must be noted here that two output shafts 37 are received rotatably in two connection bearings 38 which are fastened respectively with the two rear points of the bottom frame 21. Each of two output shafts 37 is fastened respectively at both ends thereof with the hub of the rear wheel 39 and the differential gear 36. The differential gear 36 of the present invention is similar in construction and operating principle to the differential gear for an automotive vehicle.

Figure 3:
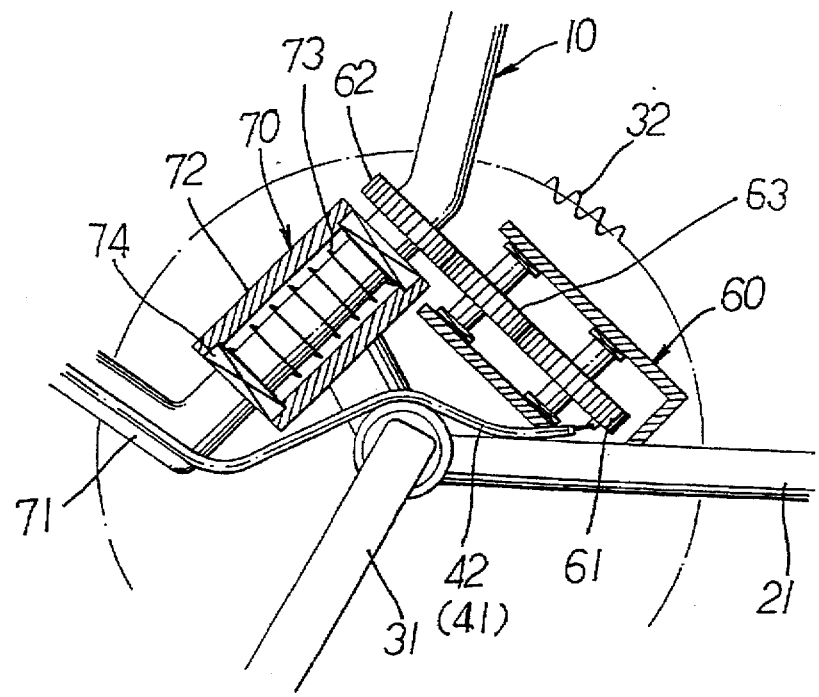
FIG. 3 shows a partial schematic view of an auxiliary steering system of the vehicle as shown in FIG. 1.
Figure 4:
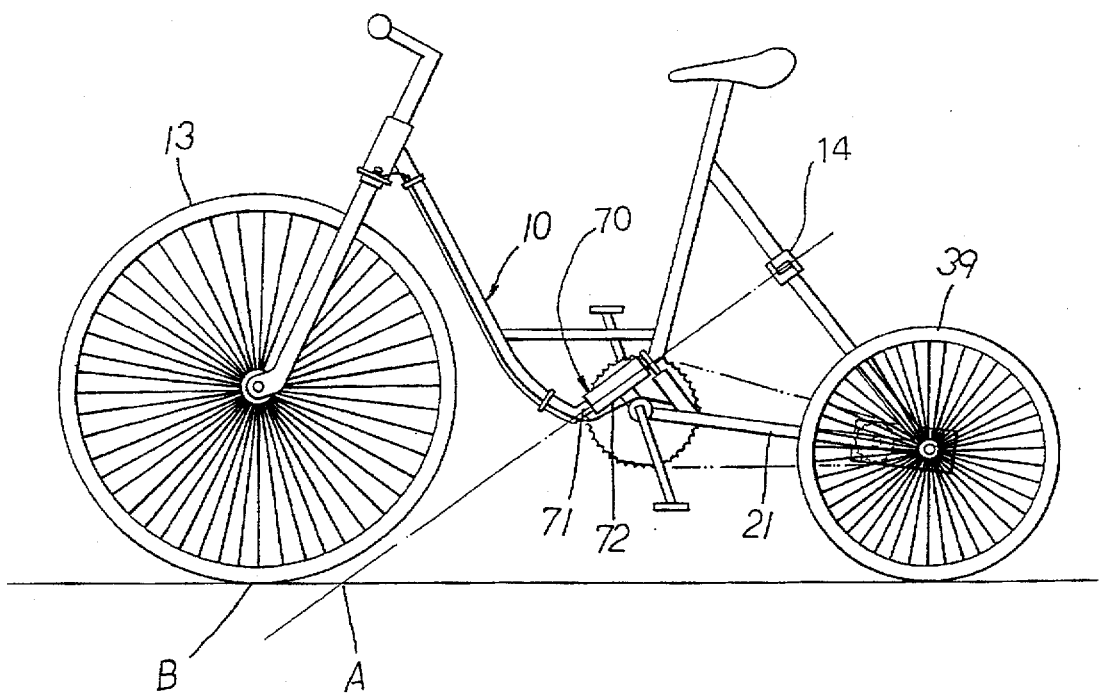
FIG. 4 shows a side elevational view of the three-wheeled vehicle as shown in FIG. 1.
Figure 5:
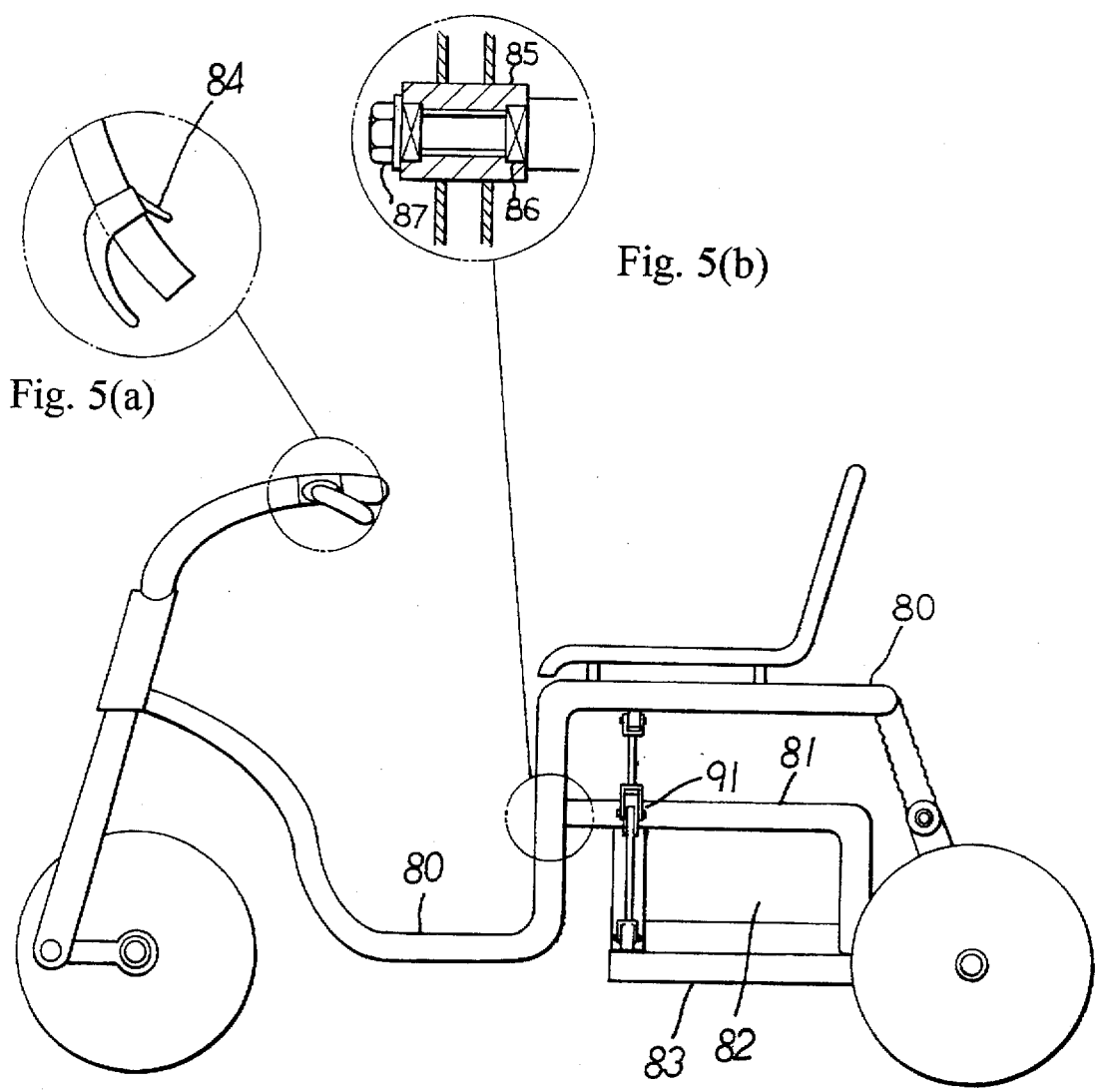
FIG. 5 shows a schematic view of an auxiliary steering system of a prior art three-wheeled vehicle.

As shown in FIGS. 1 and 4, the front frame 10 and the rear frame 20 are fastened pivotally by two bearing systems 14 and 70, which have a same pivoting axis and may be similar or dissimilar in construction to each other. The bearing system 14 has a pivoting pin (not shown in the drawings) which is put through two pivoting holes (not shown in the drawings) located respectively at the bottom end of the reinforcing rod 15 and at the top end of the support frame 22. In other words, the reinforcing rod 15 and the support frame 22 are fastened pivotally by the pivoting pin of the bearing system 14. Now referring to FIG. 3, the bearing system 70 is composed of a sleeve 72, two bearings 74, and a revolving shaft 71. The sleeve 72 is located at the front end of the bottom frame 21. Two bearings 74 are received respectively in both ends of the sleeve 72. The revolving shaft 71 is fitted into the bearings 74 and is a part of the front frame 10. The revolving shaft 71 is provided with two retaining rings or similar elements (not shown in the drawing) for holding the revolving shaft 71 securely in the sleeve 72. The revolving shaft 71 is fitted into a spiral spring 73 which has one end that is fastened with the inner wall of one end of the sleeve 72, and another end that is fastened with the revolving shaft 71. In other words, the spiral spring 73 is fitted over the revolving shaft 71 such that the spiral spring 73 is located between two bearings 74.

As shown in FIGS. 1, 1(a) and 3, the vehicle of the present invention further comprises a disk 40 which is fastened with the front fork 12 and is provide with two steel cables 41 and 42. The steel cables 41 and 42 are fastened respectively at one end thereof with the left and the right sides of the disk 40. In the meantime, another ends of the steel cables 41 and 42 are secured to an input gear 61 at the opposite sides of a revolving shaft on which said input gear 61 of a gear box 60 is mounted. An output gear 62 is mounted on the revolving shaft 71. The input gear 61 and the output gear 62 are linked by an intermediate gear 63. When the handlebar 11 is turned, the disk 40 is caused to rotate along with the front fork 12. As a result, one of two steel cables 41 and 42, which is located at the side away from the direction in which the handlebar 11 is turned, is so pulled as to actuate the input gear 61 to rotate. The output gear 62 is subsequently actuated to turn by the gear ratio conversion of the intermediate gear 63, thereby resulting in the rotation of the revolving shaft 71 and in the turning of the front frame 10 on the pivoting axis of the bearing system in a direction in which the handlebar 11 is turned. The center of gravity of the vehicle rider is therefore caused to move toward a direction in which the handlebar 11 is turned, so as to cancel out the centrifugal force exerting on the vehicle operator. In the meantime, one of two rear wheels 39, which is located on the side close to the direction in which the handlebar 11 is turned, is caused to reduce its speed by an increase in friction force exerting thereon. On the other hand, another one of two rear wheels 39 is caused to accelerate by the action of the differential gear 36 so as to enable the vehicle in motion to negotiate a curve without difficulty. It is preferably that the three-wheeled vehicle of the present invention is provided additionally with a means which is disposed between the revolving shaft 71 and the sleeve 72 for preventing the revolving shaft 71 and the sleeve 72 from having an excessive rotational angle in relation to each other, so as to avert an incident in which the front frame 10 is caused to turn excessively when the vehicle in motion is negotiating a curve.

As shown in FIG. 4, are imaginary extension line of the pivoting axis of the bearing systems 14 and 70 intersects the ground surface at point A, which is located behind point B where the front wheel 13 makes contact with the ground surface, i.e. said intersection point A is closer to said rear wheels than said contact point B. In other words, there is an offset between the extension line of the pivoting axis of the bearing systems 14 and 70, and the contact point B of the front wheel 13. The implication of such an offset as described above is that the front frame 10 and the rear frame 20 can be caused to shape like an arch when the front frame 10 is caused to swivel in response to the turning of the handlebar 11. At the conclusion of the swiveling motion of the front frame 10, the combined effect of the weights of the vehicle and the vehicle operator has a tendency to cause the front frame 10 to return to its initial form.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A three-wheeled vehicle having an auxiliary steering system, said three-wheeled vehicle comprising:

a frame;

three wheels fastened rotatably with said frame such that said three wheels support said frame on a horizontal surface, and that centers of said three wheels form an isosceles triangle; and a steering system comprising a front fork fastened rotatably with said frame and provided at one end thereof with a handlebar fastened securely thereto, said front fork further provided at another end thereof with a front wheel which is one of said three wheels and is fastened rotatably thereto, said from fork being mounted rotatably round a central axis;

characterized in that said frame further comprises an auxiliary steering system comprising:

a front frame provided at one end thereof with said front fork;

a rear frame provided at one end thereof with two rear wheels which are two of said three wheels and are fastened rotatably thereto;

a bearing mechanism adapted to fasten pivotally another end of said front frame with another end of said rear frame such that a planar surface defined by a pivoting axis of said bearing mechanism and said central axis divide equally said isosceles triangle formed by said centers of said three wheels;

a first gear fastened securely with said front frame;

a second gear fastened rotatably with said rear frame such that said second gear is engageable indirectly with said first gear; and a transmission mechanism for transmitting an angular motion of said front fork to said second gear to actuate said second gear to turn, thereby causing said front frame to turn on said pivoting axis toward a direction in which said handlebar is turned, wherein said transmission mechanism comprises a disk and two steel cables, said disk being fastened securely with said front fork such that said disk can be actuated to move around said central axis along with said front fork, said two steel cables being fastened at one end thereof with two opposite sides of said disk and at another end thereof with two opposite sides of a revolving shaft of said second gear, so that said second gear can be actuated by one of said two steel cables to turn in one direction when said handlebar is turned in said one direction, and said second gear can be actuated by another one of said two steel cables to turn in another direction opposite to said one direction when said handlebar is turned in said another direction.

2. The three-wheeled vehicle as defined in claim 1, wherein said bearing mechanism comprises a sleeve provided on said rear frame, two bearings fastened respectively in both ends of said sleeve, and a revolving shaft received in said two bearings wherein said revolving shaft is a part of said front frame.

3. The three-wheeled vehicle as defined in claim 2, wherein said first gear is mounted on said revolving shaft.

4. A three-wheeled vehicle having an auxiliary steering system, said three-wheeled vehicle comprising:

a frame;

three wheels fastened rotatably with said frame such that said three wheels support said frame on a horizontal surface, and that centers of said three wheels form an isosceles triangle; and a steering system comprising a front fork fastened rotatably with said frame and provided at one end thereof with a handlebar fastened securely thereto, said front fork further provided at another end thereof with a front wheel which is one of said three wheels and is fastened rotatably thereto, said front fork being mounted rotatably round a central axis;

characterized in that said frame further comprises an auxiliary steering system comprising:

a front frame provided at one end thereof with said front fork;

a rear frame provided at one end thereof with two rear wheels which are two of said three wheels and are fastened rotatably thereto;

a bearing mechanism adapted to fasten pivotally another end of said front frame with another end of said rear frame such that a planar surface defined by a pivoting axis of said bearing mechanism and said central axis divide equally said isosceles triangle formed by said centers of said three wheels, wherein said pivoting axis has an imaginary extension line which intersects a horizontal surface at an intersection point; wherein said front wheel makes contact with said horizontal surface at a contact point; and wherein said intersection point is closer to said rear wheels than said contact point;

a first gear fastened securely with said front frame;

a second gear fastened rotatably with said rear frame such that said second gear is engageable indirectly with said first gear; and a transmission mechanism for transmitting an angular motion of said front fork to said second gear to actuate said second gear to turn, thereby causing said front frame to turn on said pivoting axis toward a direction in which said handlebar is turned.

* * * * *

UNITED STATES PATENT AND TRADEMARK OFFICE
CERTIFICATE OF CORRECTION

PATENT NO. : 5,678,835
DATED : October 21, 1997
INVENTOR(S) : Sung et al.

It is certified that error appears in the above-indentified patent and that said Letters Patent is hereby corrected as shown below:

Col. 3, line 17 "which-are" should be --which are--; and

Col. 4, line 26 "are" should be --an--.

Signed and Sealed this

Twenty-third Day of December, 1997

Attest:

BRUCE LEHMAN

Attesting Officer

Commissioner of Patents and Trademarks